United States Patent [19]
Davis et al.

[11] Patent Number: 5,332,188
[45] Date of Patent: Jul. 26, 1994

[54] MOTOR MOUNTING BRACKET

[75] Inventors: William L. Davis, Murfreesboro, Tenn.; Daniel R. Messner, St. Louis, Mo.

[73] Assignee: Emerson Electric Co., St. Louis, Mo.

[21] Appl. No.: 927,008

[22] Filed: Aug. 10, 1992

[51] Int. Cl.⁵ ............................................. F16F 15/02
[52] U.S. Cl. ............................. 248/674; 248/638; 248/675; 248/903; 310/91
[58] Field of Search ............... 248/201, 605, 637, 638, 248/672, 674, 675, 903; 310/91

[56] References Cited

U.S. PATENT DOCUMENTS

| | | | |
|---|---|---|---|
| 2,217,788 | 10/1940 | Blake | 248/638 |
| 2,509,137 | 5/1950 | Denman | 310/91 X |
| 2,910,262 | 10/1959 | Haessler | 248/638 X |
| 3,310,268 | 3/1967 | Kramer | 248/903 X |
| 3,326,503 | 6/1967 | Bade | 248/672 |
| 3,790,114 | 2/1974 | Italiano et al. | 248/13 |
| 4,019,704 | 4/1977 | Levine | 248/637 |
| 4,076,197 | 2/1978 | Dochterman | 310/91 X |
| 4,441,684 | 4/1984 | Credle, Jr. | 248/674 |
| 4,601,378 | 7/1986 | Pierce et al. | 248/674 X |
| 4,636,673 | 1/1987 | McDonald | 310/91 |

Primary Examiner—Eugenia Jones
Assistant Examiner—Raymond D. Woods
Attorney, Agent, or Firm—Polster, Lieder, Woodruff & Lucchesi

[57] ABSTRACT

A bracket for mounting a motor which drives a fan in a dehumidifier or the like includes two or more arms secured directly to the motor's housing. The bracket includes a rib which spans nearly the full length of an extender of the arm and gussets at the various junctions of the arm. The use of the rib and gussets in the arm substantially isolates motor vibration and reduces imbalance of the impeller and/or the driven component.

7 Claims, 3 Drawing Sheets

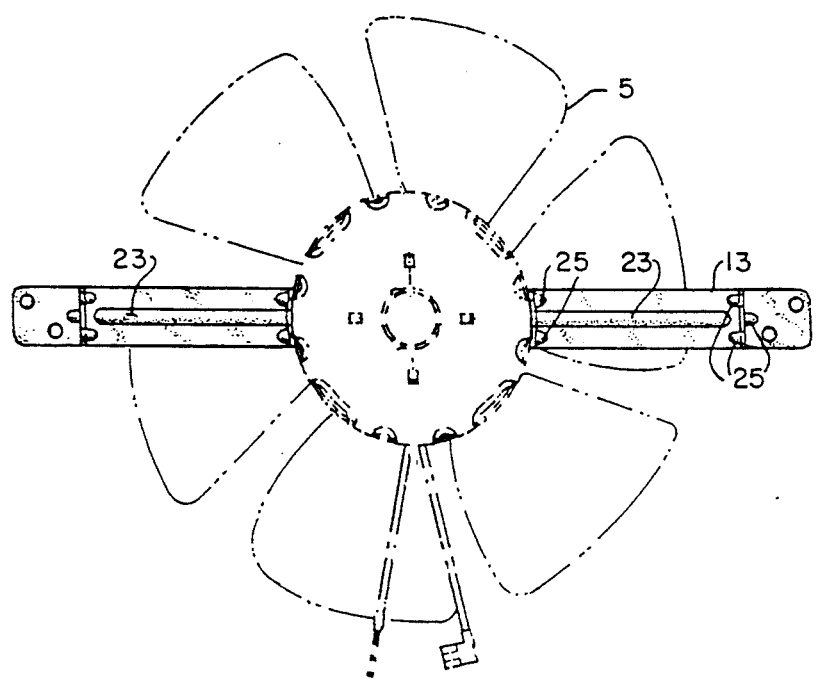
FIG.4.
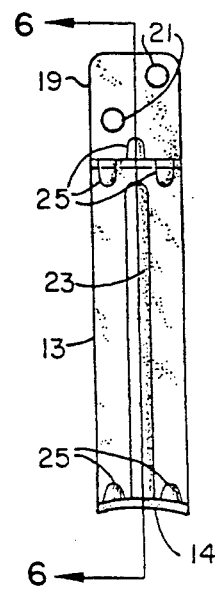
FIG.5.
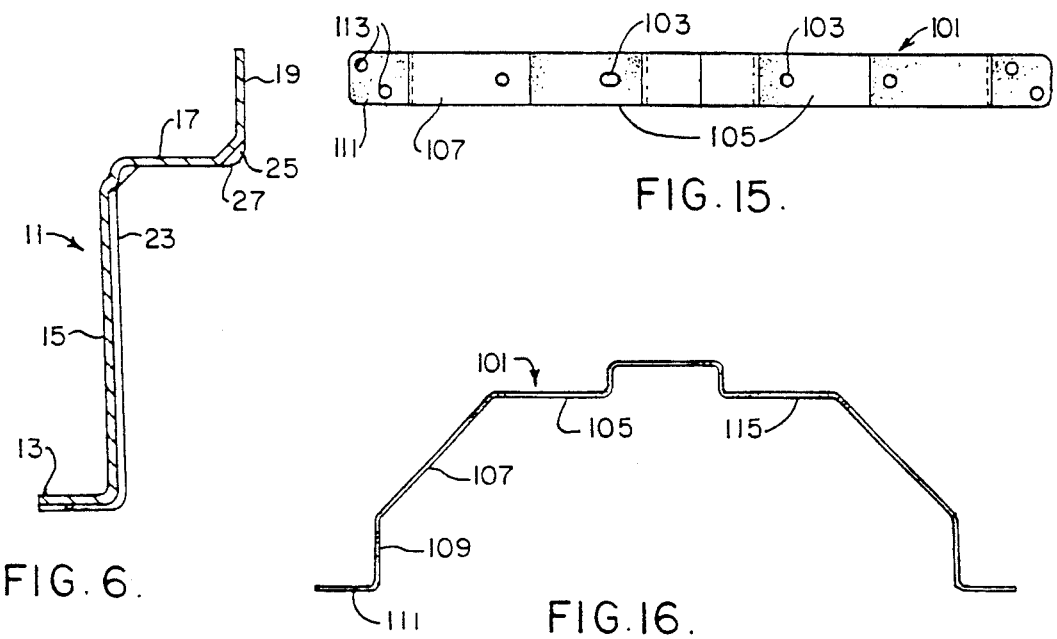
FIG.6.
FIG.15.
FIG.16.

MOTOR MOUNTING BRACKET

BACKGROUND OF THE INVENTION

This invention relates to mounting brackets for motors, and in particular, to a bracket which reduces or isolates motor vibration.

Many products, such as air conditioners and dehumidifiers, use fans to induce a draft to pull air to be treated into the device. The motors are mounted in these devices by means of brackets which, in turn, are secured to structural supports within the devices. An example of a prior art bracket 101 is shown in FIGS. 15 and 16. As can be seen, the prior art bracket is a generally U-shaped bracket. The motor is secured to this bracket by way of throughbolts which extend through bolt holes 103 in base 105 of the bracket. Arms 107 extend upwardly and away from base 105 and any motor that is secured to the bracket. A vertical section 109 extends upwardly from arm 107 and has a flange 111 at the top thereof. Flange 111 has bolt holes 113 to secure the bracket and motor to the device.

While such prior art brackets work for their intended purpose, in use, brackets such as bracket 101, allow the motor to vibrate, sometimes severely. Vibrations in turn cause the unit to generate noise, often at an unacceptable level. The problem of noise often is accentuated because of the cantilever action caused by the fan blade curvature, particularly if the blade is unbalanced for any reason. The bracket described hereinafter overcomes these prior art problems through a unique structural arrangment for providing isolation of the motor/blade combinations from the assoicated mounting structures.

SUMMARY OF THE INVENTION

One object of the invention is to provide a motor mounting bracket which will reduce or isolate motor vibration.

Another object is to provide such a bracket which isolates blade imbalance.

Another object is to provide such a bracket which is economical to produce and simple to apply.

These and other objects will become apparent to those skilled in the art in light of the following disclosure and accompanying drawings.

In accordance with the invention, generally stated, a bracket for a dynamoelectric machine is provided which has two or more arms secured to a motor shell. The bracket arms are evenly spaced around the motor shell and include a mounting plate for securing the arm to the motor shell, an extender perpendicular to the mounting plate, a riser extending upwardly from the extender, and a mounting flange for mounting the bracket to a support. The extender has a rib formed in it, which runs along substantially its full length. Gussets are formed at the junctions of the mounting plate and the extender, the extender and the riser, and the riser and the mounting flange. The gussets formed at the junctions of the extender are preferably formed in pairs.

BRIEF DESCRIPTION OF THE DRAWINGS

FIG. 4 is a bottom plan view of the embodiment of FIG. 1;

FIG. 5 is a top plan view of an arm forming the mounting bracket of FIG. 1;

FIG. 6 is a cross-sectional view of the bracket arm taken along line 6—6 of FIG. 5;

FIG. 15 is a plan view of a prior art bracket used in the comparison of FIGS. 7-14; and FIG. 16 is a side elevational view of the prior art bracket shown in FIG. 15.

DESCRIPTION OF THE PREFERRED EMBODIMENT

Figure 1:
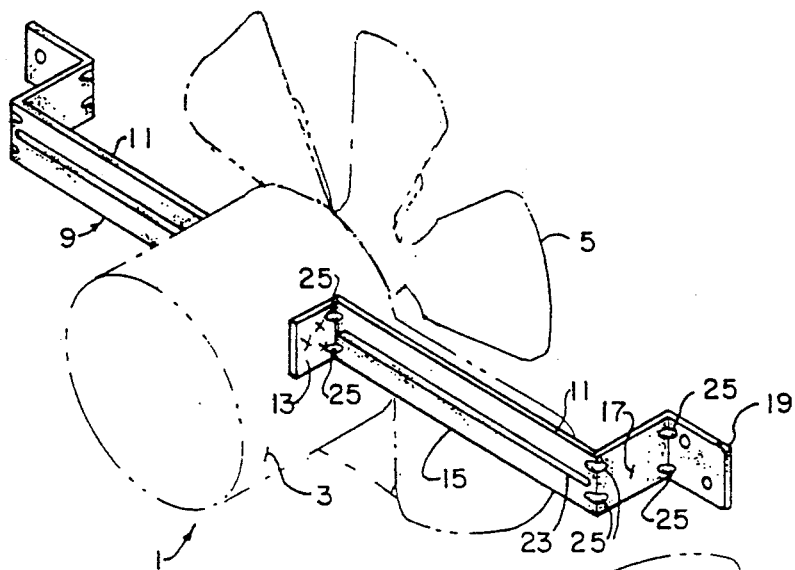
FIG. 1 is a perspective view of one illustrative embodiment of motor mounting bracket of the present invention applied to a motor, the motor being shown in phantom.
Figure 2:
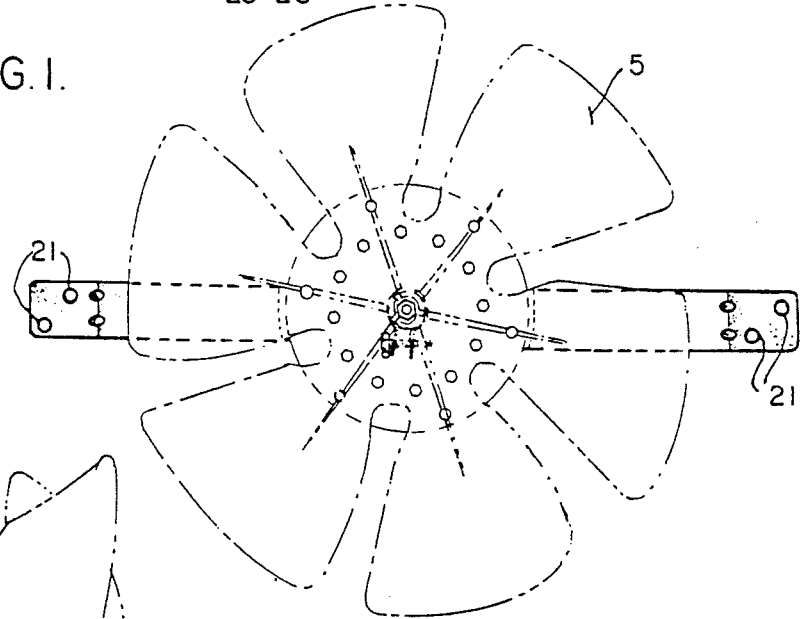
FIG. 2 is a top plan view of the embodiment shown in FIG. 1.
Figure 3:
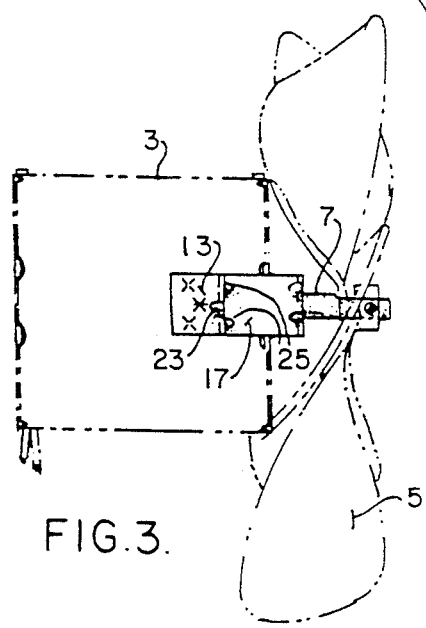
FIG. 3 is a side elevational view of the embodiment shown in FIG. 1.
Figure 7:
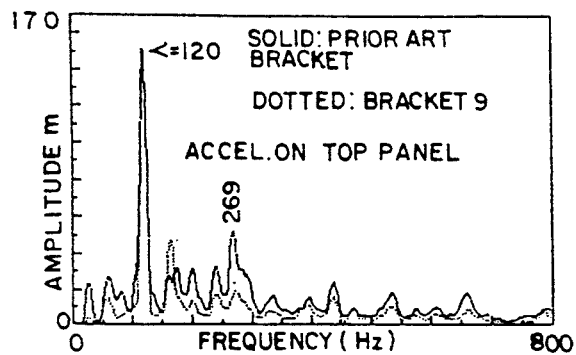
FIGS. 7-14 are graphs charting vibration amplitude from 0 through 800 Hz, comparing the bracket of this invention with a prior art bracket.
Figure 11:
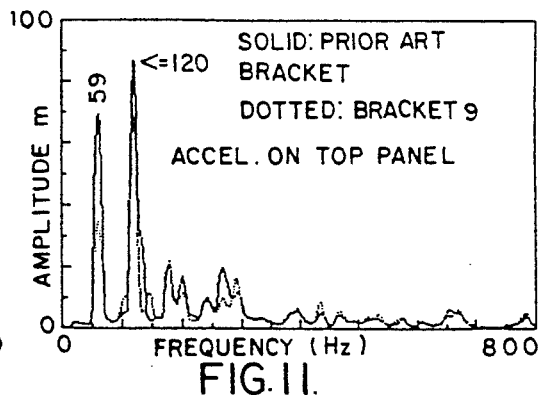
Figure 8:
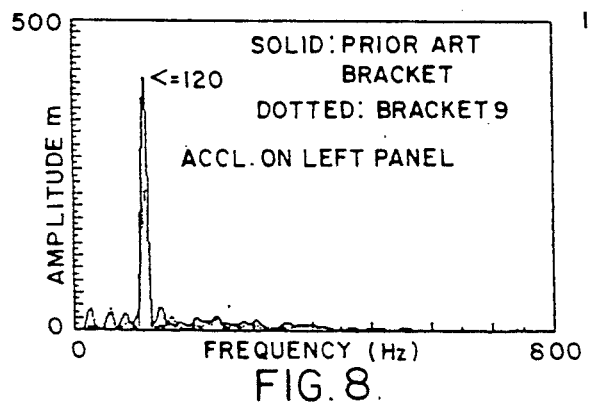
Figure 12:
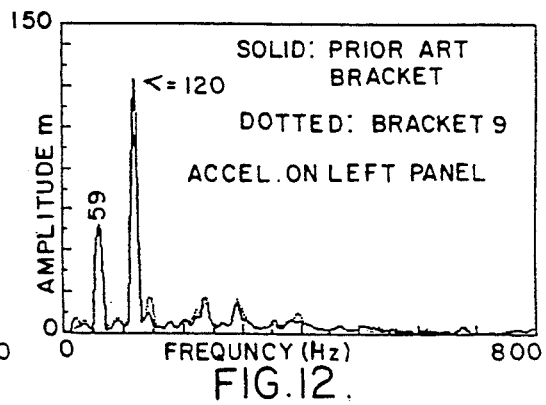
Figure 9:
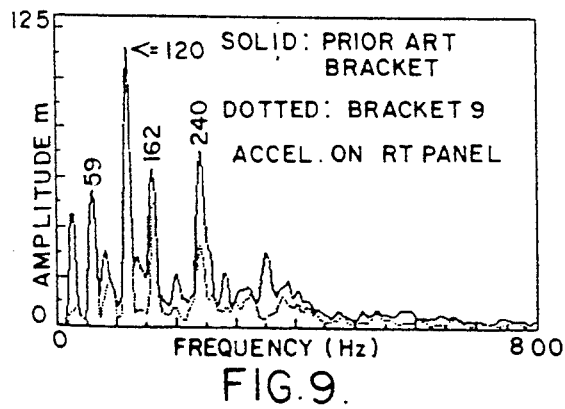
Figure 13:
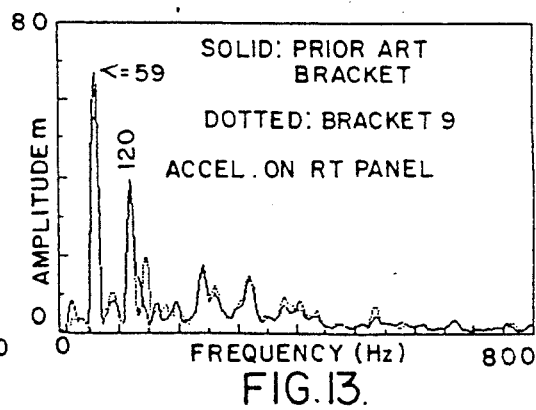
Figure 10:
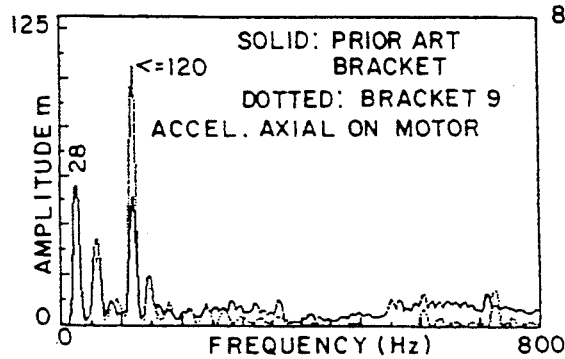
Figure 14:
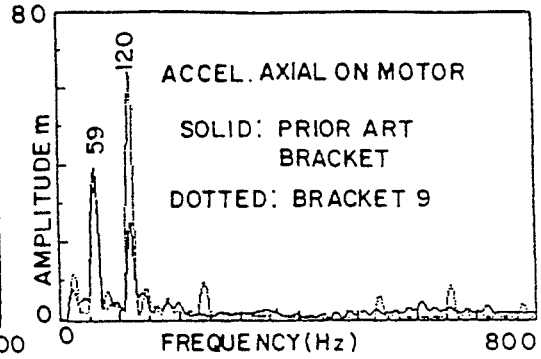

Referring to FIGS. 1-6, there is shown a motor 1 having a casing, housing, or shell 3 and an impeller 5 which is mounted on the motor shaft 7. Motor 1 is conventional and may comprise any of a variety of dynamoelectric machines. Commonly, A.C, induction motors of split phase or shaded pole designs are employed in the application described. The motor 1 is not described in detail. A mounting bracket 9 mounts the motor to structural supports within dehumidifiers or the like. Bracket 9, in the embodiment illustrated, includes a pair of arms 11 which are welded or otherwise secured to motor housing 3. The bracket arms 11 are welded to the housing at locations 180° apart, in the embodiment illustrated, generally perpendicular to the centerline 6 of a shaft 7. Although only two arms 11 are shown, those skilled in the art will recognize that other number of arms 11 could be used, if desired.

Each bracket arm 11 is formed to include a mounting plate 13. Mounting plate 13 is used to attach the arm 11 to the motor housing 3. Plate 13 is formed to include a curved surface 14, best shown in FIG. 5, which conforms to the curvature of motor housing 3. An extender 15 is formed generally perpendicularly to plate 13 and to housing 3. A riser 17 extends outwardly from extender 15, referred to in FIG. 6. Extender 15 is sufficiently long to provide clearance between blades 5 and riser 17. A mounting flange 19 extends outwardly from riser 17 and provides means for mounting the bracket 9 and motor 1 to a support or frame, not shown, by means of bolt hole 21 formed in flange 19. A rib 23 is formed in extender 15 and extends substantially the full length thereof. There are also gussets 25 formed at the junction of plate 13 and extender 15, extender 15 and riser 17, and riser 17 and flange 19. There are preferably five gussets 25: two at the junction of plate 13 and extender 15, two at the junction of extender 15 and riser 17, and one at the junction of riser 17 and flange 19. As shown in FIG. 1, two gussets 25 may be formed at the riser/flange junction.

In a 0.01 Hp motor driving an 8" fan blade, as is commonly used for dehumidifiers, arms 11 are preferably made of a 15 gage steel plate, approximately 0.78" in width. Plate 13 is preferably about 0.75" in length; extender 15 is preferably about 3" in length; riser 17 is preferably about 1.1" in length; and flange 19 is preferably about 1" in length. Rib 23 is preferably about 0.2" wide and about 0.09" deep. Gussets 25 are formed by creating an approximately 45° bevel 27 in the bevel's associated junction. This is shown in FIG. 6 for the gusset 25 between riser 17 and flange 19.

While the exact technical reason for isolation provided by the bracket 9 is unknown, use of bracket 9 can isolate impeller imbalance and can substantially reduce vibration in applicational use of the motor 1. Testing shows that vibration is reduced up to 80%. The ability of the bracket design to isolate the impeller imbalance and to reduce vibration is in part due to the geometry of the rib and gussets. It is believed that the geometry of the bracket design allows for the frequency peaks to be attenuated. This results from the elasticity of gussets 25, the placement of rib 23, the length of extender 13, and the width and thickness of the material from which arms 11 are made.

FIGS. 7-10 show the reduction of vibration when using bracket 9, in comparison with the prior art bracket 101 of FIGS. 15 and 16, the fan being operated at high speed. Vibration amplitude measurements were taken on the top, right, and left panels of a dehumidifier in which the fans were mounted as well as along the motor shaft axis. The graphs show the vibration amplitude of the prior art bracket 101 in solid lines and the vibration amplitude of bracket 9 in dotted lines. As can be seen, the vibration is reduced through out the full range of frequencies.

FIGS. 11-14 chart the same information except that the fan is operated at low speeds. The superior performance of bracket 9 can be seen here also.

Numerous variations, within the scope of the appended claims will be apparent to those skilled in the art in light of the foregoing description and accompanying drawings. For example, the number of brackets 9 employed in any particular application may vary. Likewise, dimensions used for the bracket 9 may be changed. The number of gussets may be altered, or the length of rib 25 may be changed. These variations are merely illustrative.

We claim:

1. A mounting bracket for a motor, the motor including a motor housing, the bracket comprising at least two independent, one-piece arms, each of said arms being attached to the motor housing, each of said arms including:
   a mounting plate for attaching each of said arms to said motor housing;
   an extender having a first end connected to said mounting plate, said extender having a predetermined length, being generally perpendicular to said mounting plate and extending outwardly from said mounting plate;
   a riser generally parallel to said mounting plate extending outwardly from said extender at a second end of said extender remote from said extender first end; and
   a mounting flange for mounting said bracket to a support, said mounting flange extending outwardly from said riser generally parallel to said extender;
   said extender including a rib for providing vibration isolation between said motor and any associated mounting for said motor.

2. The bracket of claim 1 wherein said rib extends substantially the full length of said extender.

3. The bracket of claim 2 wherein each of said arms further includes at least one gusset.

4. The bracket of claim 3 further including a plurality of gussets, at least one of said gussets being formed at one of a junction of said mounting plate and said extender, a junction of said extender and said riser, and a junction of said riser and said mounting flange.

5. The bracket of claim 4 wherein at least two of said gussets are formed in a pair at one of a junction of said extender and said mounting plate, a junction of said extender and said riser, and a junction of said riser and said mounting flange.

6. The bracket of claim 1 wherein said rib has a depth equal to approximately 11% of a width of said extender.

7. The bracket of claim 6 wherein said rib has a width equal to approximately 25% of a width of said extender.

* * * * *